United States Patent [19]

Luke

[11] Patent Number: 4,817,674

[45] Date of Patent: Apr. 4, 1989

[54] TRAP FOR CAPTURING ANIMALS

[76] Inventor: Johannes Luke, Muhlenweg 14, 3477 Marienmunster, Fed. Rep. of Germany

[21] Appl. No.: 138,638

[22] Filed: Dec. 28, 1987

[30] Foreign Application Priority Data

Dec. 28, 1987 [DE] Fed. Rep. of Germany ....... 3744309

[51] Int. Cl.⁴ ............................................. A01M 23/26
[52] U.S. Cl. ............................................. 43/88; 43/90
[58] Field of Search .................... 43/88, 89, 90, 91, 92, 43/96, 97, 95

[56] References Cited

U.S. PATENT DOCUMENTS

| | | | |
|---|---|---|---|
| 787,013 | 4/1905 | Tweedt | 43/90 |
| 1,234,120 | 7/1917 | Bernard | 43/88 |
| 1,904,188 | 4/1933 | Zahm et al. | 43/88 |

Primary Examiner—M. Jordan
Attorney, Agent, or Firm—Sprung Horn Kramer & Woods

[57] ABSTRACT

The animal trap features two shackles (1, 1a) produced from flat or iron rod, such shackles being situated opposite each other in plate hinges (4) and turnable therein about mutually offset pins (5, 5a) and maintained under tension by two springs (3) embodied as flat shank springs or screwed shank springs. Both hinge sheets (4) are separated from each other by means of a connecting web (15) that is produced from flat iron or shaped like a tube and that forms the medial longitudinal axis of the trap, upon which connecting web is borne in such a way as to be capable of movement a release mechanism having an element suitable for accepting bait (26), which release mechanism, when the trap is in the tensed position, acts with a shackle (1) in order to lock the trap in such a position. By means of the offset placement of the pins (5, 5a), one shackle (1a) acts as the stationary shackle while the second shackle (1) acts as the striking shackle, inasmuch as the latter, during the synchronic torsion of the trap, strikes the animal, killing the latter in the appropriate spot.

16 Claims, 9 Drawing Sheets

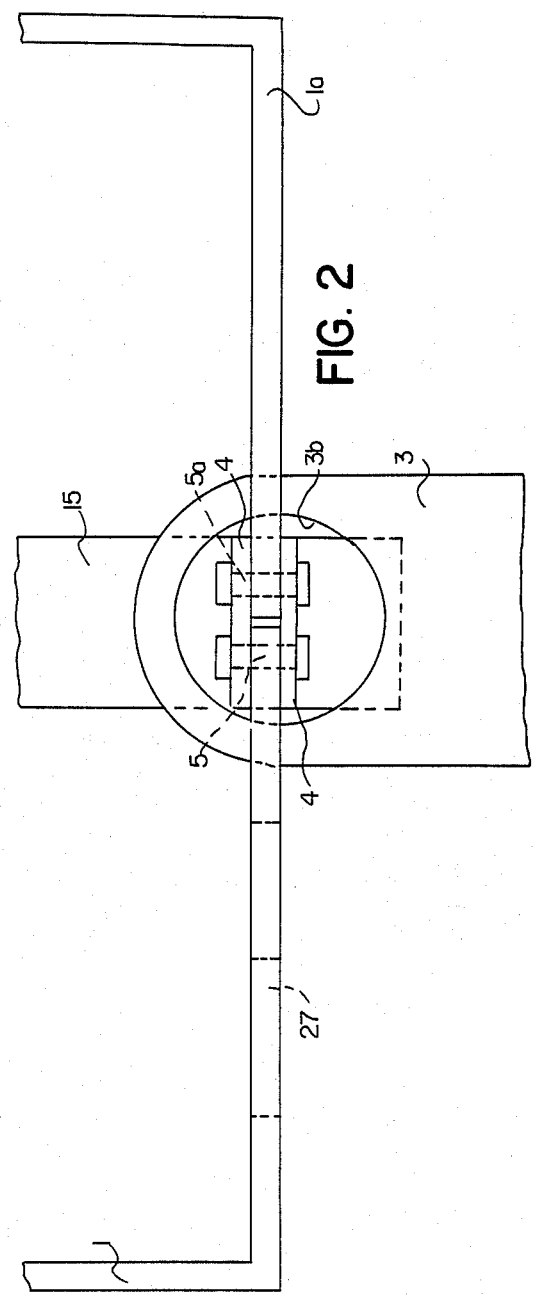
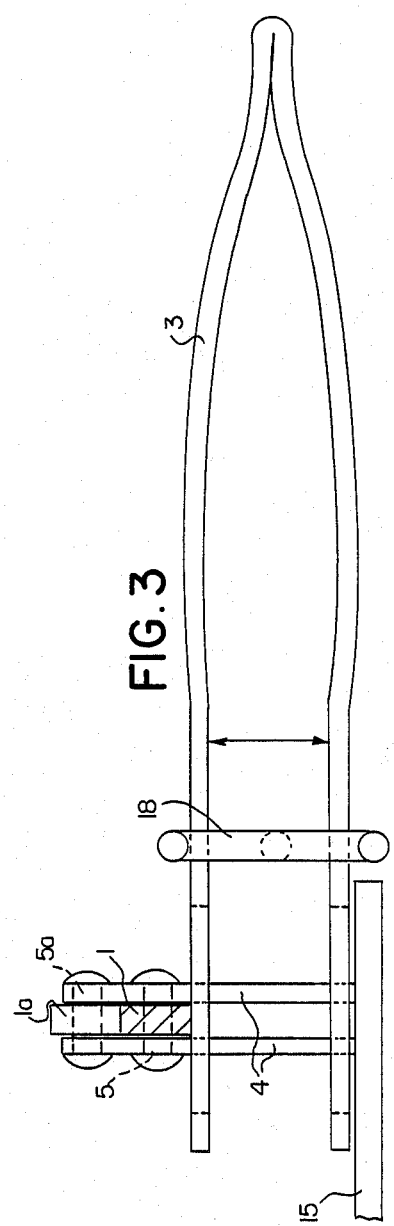

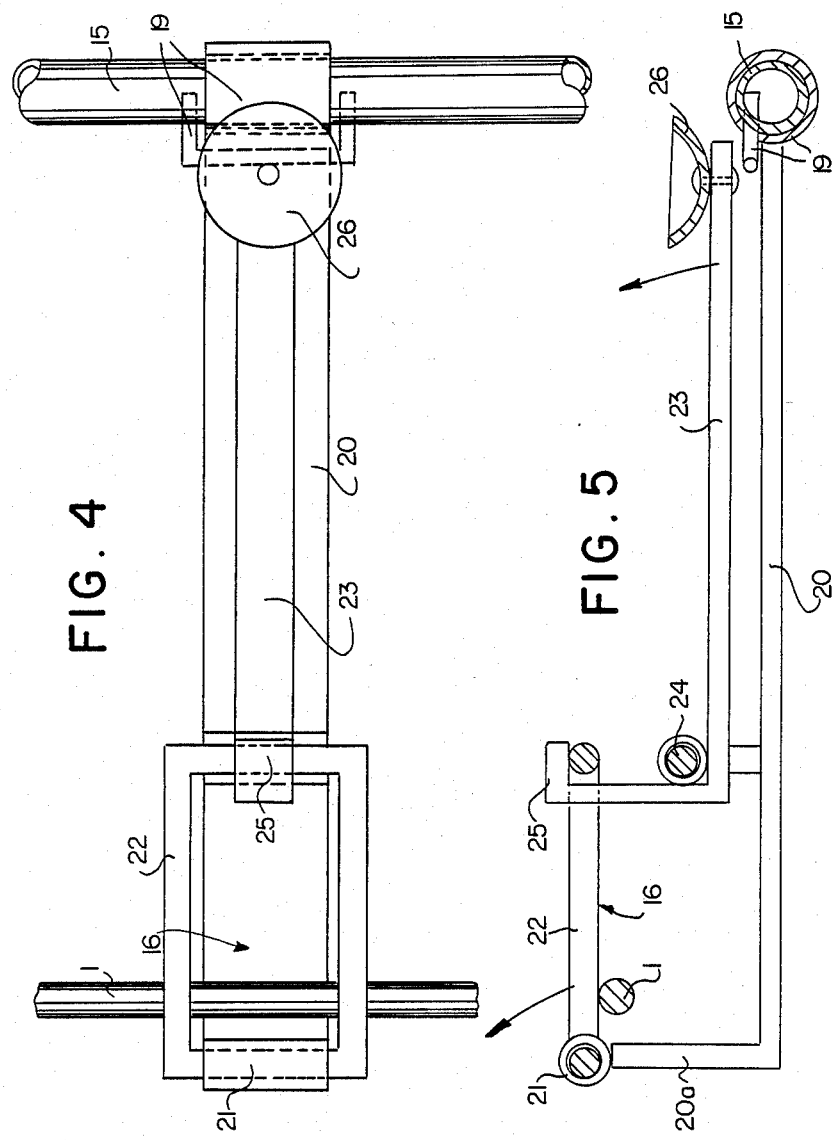

TRAP FOR CAPTURING ANIMALS

The invention relates to an animal trap having two shackles set opposite each other in plate hinges, whereby the pair of shackles can be tensed by at least one tension spring and kept locked by means of a release mechanism.

An apparatus of this kind is known from U.S. Pat. No. 1,939,109.

The above-mentioned apparatus has the disadvantage that the hinged bearings for the shackles are arranged directly opposite each other in the horizontal plane, whereby the shackles during slewing strike each other, the result of which being that in certain situations, animals are thrown upward by one of the shackles and then trapped by the other shackle, whereby only the legs of the animal are trapped.

The object of the invention is the creation of an animal trap to be employed on the ground as a trigger mechanism, whereby the animal to be trapped is always completely caught and killed by striking in the correct spot.

This objective is met by the invention through the distinguishing characteristics of claim 1, in which connection the embodiment features of the subsidiary claims represent advantageous variations of the solution to the dificiencies found in the prior art.

The object of the invention extends not only to the features of the individual claims, but also to a combination thereof.

The embodiment of the invention relates to the release mechanism which makes it possible for a larger model of the present trap possessing a very high spring tension (approx. 150 kg) to be very easily sprung.

The essence of the invention involves the snapping together of the shackles, whereby at least one shackle is thrown over the animal and closes.

Traps such the one described in the US published patent first mentioned, in which the shackles snap together at the same time, are employed on the ground as trigger mechanisms that catch the prey but do not immediately kill.

By contrast, the trap according to the invention permits the systematic killing of the trapped animals, whether or not such animals tread upon the medial axis of the trap or upon of the shackles.

In addition to featuring a simple and inexpensive construction, the trap is capable of effective action over extended periods of time.

BRIEF DESCRIPTION OF THE DRAWING

By means of the following drawings, the embodiment examples of the invention are described in greater detail. Shown are:

FIG. 3 is a side view of the flat-shank spring surrounding the shackle-bearing point, with safety part, FIG. 4 a top view of the release mechanism of the animal trap, FIG. 5 a side view in partial section, of the release mechanism FIGS. 6 to 8. side views of the animal trap in three operating positions, FIG. 9 a side view, in partial section, of a double-shackle animal trap having springs with screwed shanks and the release mechanism when the shackles are under tension, FIG. 10 a side view of the animal trap according to FIG. 9, in the trapping position, FIG. 11 a top view of the screwed-shank springs that surround the bearing point, FIG. 12 a side view of the screwed-shank spring with its safety part, FIG. 13 a side view of a further embodiment of a release mechanism FIG. 14 a frontal view of the release mechamism according to FIG. 13, FIG. 15 a perspective view of the trap, in reduced scale, FIG. 16 a section of the hinge zone with spring, from the side FIG. 17 a section of the hinge zone with spring, from the top, FIG. 18, a release mechanism in section (vertical section)

FIG. 19 shows the shackle as it is being raised (1)

FIG. 20 shows shackle (1) and shackle (1a) as they grasp the animal (14) while shackle (2) and shackle (2a) raise themselves from the ground FIG. 21 shows shackle (1) and shackle (1a) after having completely caught animal (14) and shackle (2) and shackle (2a) during closure lifting themselves further, whereby the animal (14) thus trapped is flung upward.

DESCRIPTION OF THE PREFERRED EMBODIMENT

Figure 1:
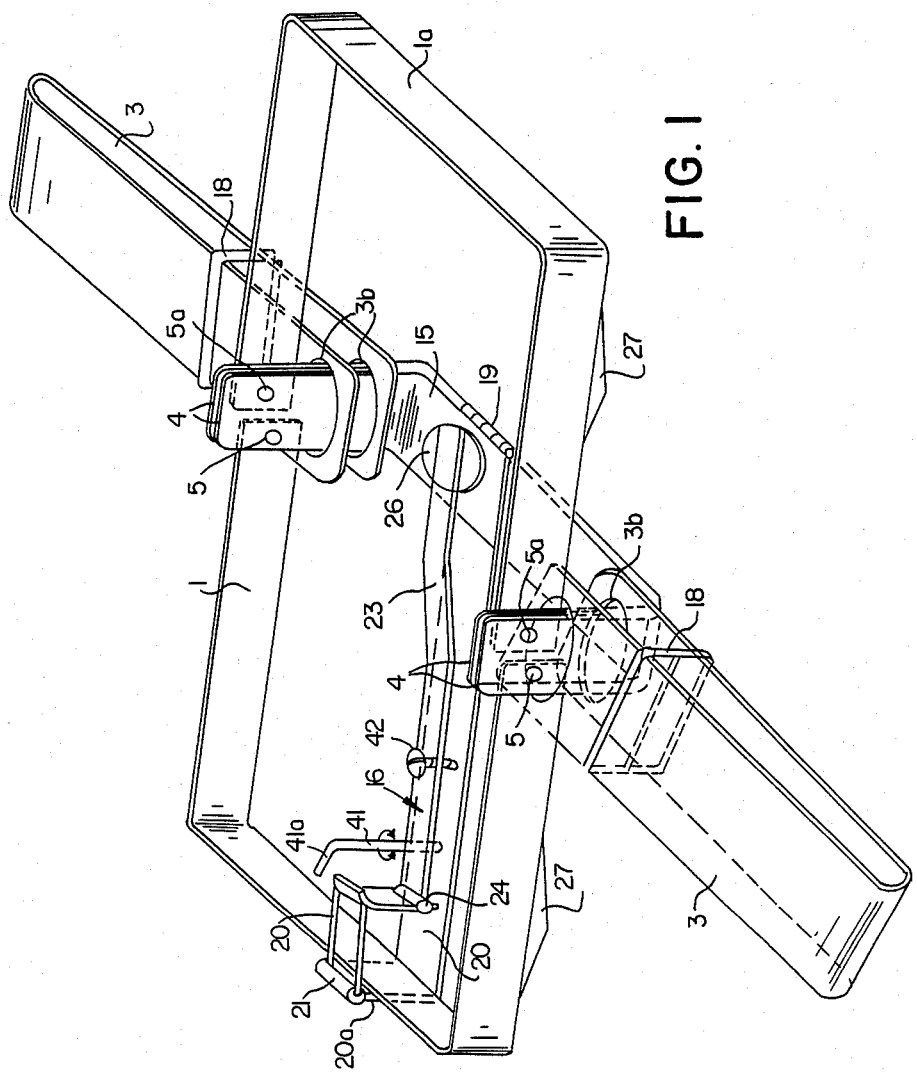
FIG. 1 is a perspective view of a double-shackle animal trap having flat steel shackles and two flat-shanked springs, FIG. 2 a top view of the bearing point of both shackles as well as the flat-shank spring surrounding such shackles.

The animal trap consists of two shackles (1, 1a) fitted into two pairs of plate hinges (4) that are separated from each other by means of a connecting web (15) that serves as the medial axis, such shackles pivoting on each of pins (5, 5a) in such a way as to be able to slew. The two shackles (1, 1a), which can be tensed by two springs (3), can be locked by means of a release mechanism (16 or 17).

In accordance with the embodiment shown in FIGS. 1 to 8, the shackles (1, 1a) are formed from flat iron shackles into a U-profile that with the free ends of its U-shanks are born between each of the plate hinge pairs (4) that is rigidly attached in an upright position to connecting web (15). The pins (5, 5a) of both shackles (1, 1a) are offset from each other in the vertical direction, whereof the spacing can be varied in order to suit different model sizes.

The shackles (1, 1a) facing each other differ in length. The length of shackle (1), whose pin (5) lies lower exceeds that of the other shackle (1a) by the distance through which the pins are offset from each other, such an arrangement promoting unhindered closure.

Both pins (5, 5a) are formed from bolts, rivets, or similar components. Both springs (3) are steel band springs, at whose extremities are featured a medial bore (3b), wherewith the springs surround the pair of plate hinges (4) and underlie the shackles (1, 1a).

In order to keep the springs (3) under tension, i.e. for the purpose of pressing and keeping both of their shanks together, a safety part (18) is placed around each spring (3) and surrounds the spring (3) in the manner of a frame, and when the spring is tensed, is slid over the spring (3) in the direction of the plate hinge (4).

The release mechanism (16), designed to hold bait and actuated by the animal preparatory to the snapping shut of the tensed shackles (1, 1a), has a rectangular lever (20), of which one end is borne by means of a hinge (19) at connecting web (15) so as to permit the rectangular lever to swing, such a rectangular lever (20) featuring at the top of upright shank (20a) situated opposite hinge (19) a security frame (22) that is borne in bearing sleeve (21) so as to be able to swing.

Release rod (23) is situated on top of rectangular lever (20) and is permitted to swing around a horizontal pin (24) that runs parallel to bearing sleeve (21), such a release rod (23) having a release hook (25) that hooks around the security frame (22) when the shackle is in the unsprung condition.

At the end of the release rod (23) facing release hook (25) is situated an accepting part (26) having the shape of a plate or a ring, etc., for the purpose of receiving pieces of bait.

To the parallel-running shackles (1, 1a) are welded obtusely angled wedges that serve as stoppers (27), against which act the springs (3) with their holes (3b) while the device is in the closed position, so as to ensure the clean closure of the shackles (1, 1a).

Both shackles (1, 1a) are, in order to tense the animal trap, swung apart about their pins (5, 5a), whereby both springs (3) are pressed together and the security frame (22) swung in behind the release hook (25) so that the shackles (1, 1a) can be locked in the tensed position.

When the animal to be trapped pulls on the bait provided, the release rod (23) swings on its pin (24), whereby the release hook (25) slides away from the security frame (22) that is produced from iron rod, which security frame, by virtue of the pressure exerted by the shackle, swings upward on its bearing sleeve (21).

Because the pins of the independent shackle (1, 1a) are offset from each other, the trap, placed upon the ground, becomes a trigger device whose shackles close in sequence.

The shackle (1) released by release mechanism (16) assumes the role of the striking shackle, snapping shut over the animal, whereupon the stationary shackle (1a) moves, while the trap turns about its own axis (15), whereby the stationary shackle (1a) remains upon the ground and virtually only the striking shackle (1) swings through an angle exceeding 90 degrees.

In order to further amplify this effect, the rectangular lever (20) of the release mechanism (16) is borne on the medial axis (15) by means of joint (19), such that the rectangular lever (20) is permitted to lie upon the ground and the medial axis (15) is able to turn together with the striking shackle (1) about such joint in the direction of the stationary shackle (1a). Such an effect can also be achieved in that the pins (5, 5a) of both shackles (1, 1a) are offset from each other and that the shackles (1, 1a) possess different lengths.

The trap must be arranged upon the ground in such a way that the animals to be trapped enter upon the stationary shackle (1a), such a situation being aided by a barrier erected in front of the striking shackle.

It is advantageous in constructions of this kind, if medium-sized animals such as weasels, foxes, etc., are to be trapped, for a space to exist between the axes (5, 5a) of 40 cm and between the shackles (1, 1a) of 36 cm. Given such dimensions, a weasel can be trapped on top of the free shackle (1a) as well as on top of the medial axis (15), which in the case of weasels always results in seizure about the thorax.

Given such dimensions, the fox can be trapped on top of the free shackle (1a), in such a way that its neck and head are seized from above and below by the shackles (1, 1a).

Figure 6:
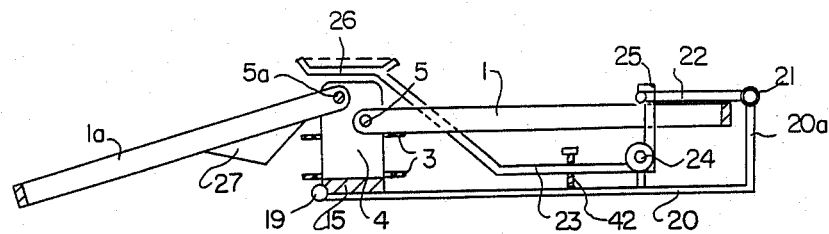

Shown in FIG. 6 is the animal trap in the tensed position.

Figure 7:
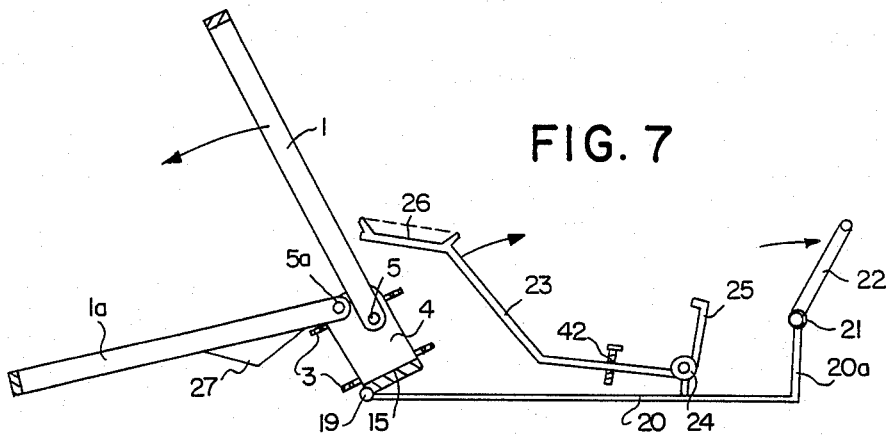
Figure 8:
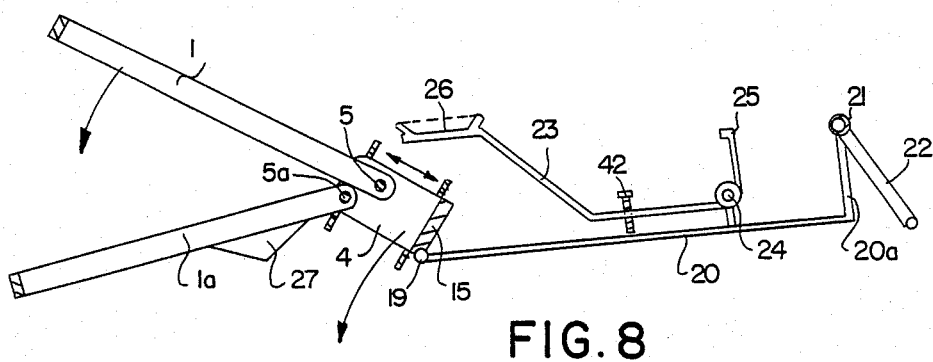
Figure 9:
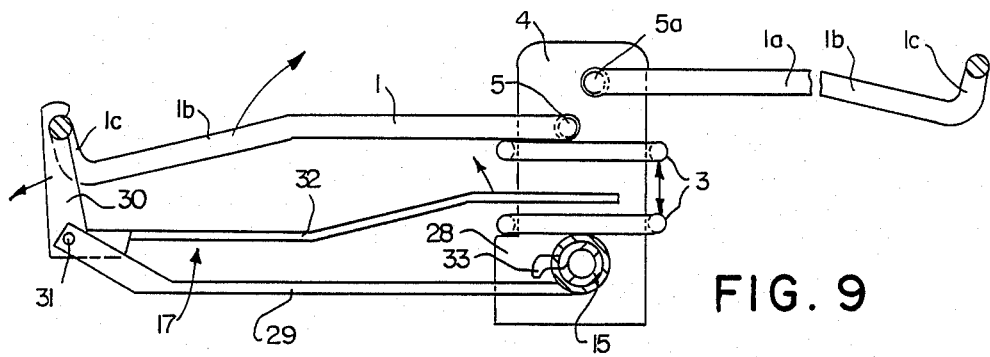
Figure 10:
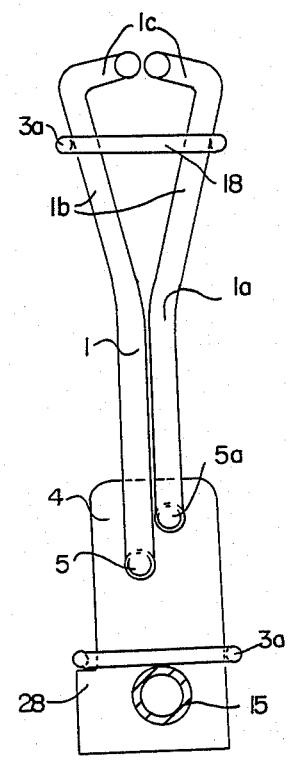
Figure 11:
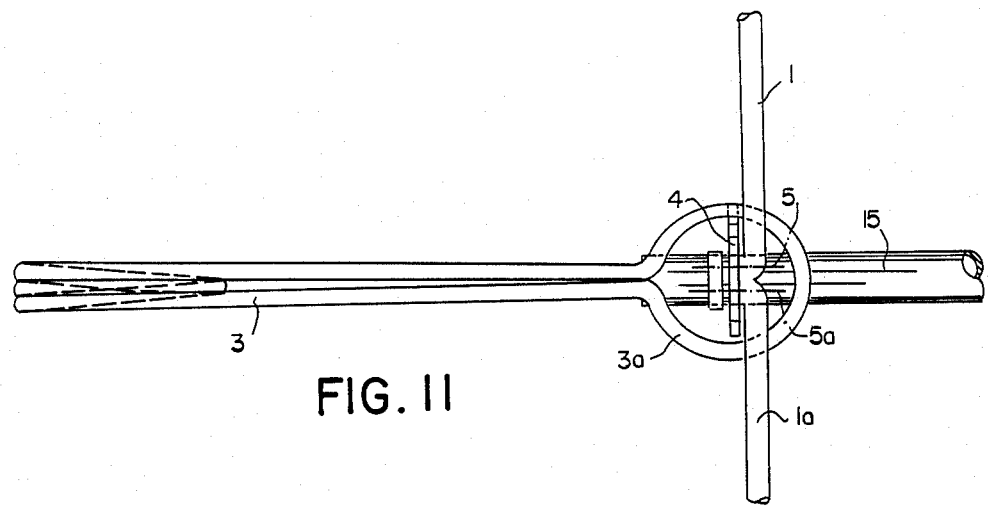
Figure 12:
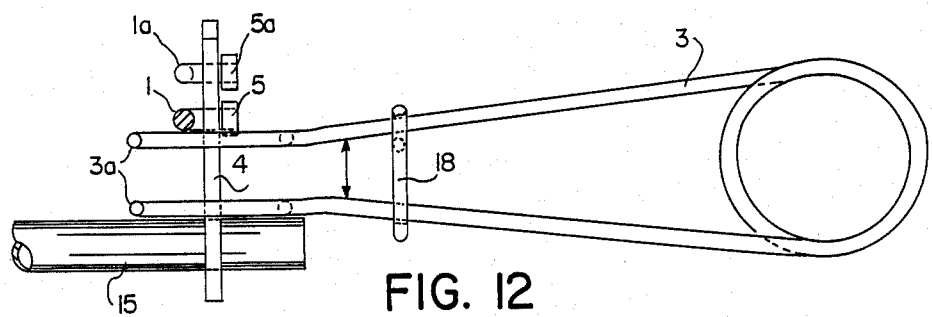

FIG. 7 shows the animal trap in its unlocked position, wherein the striking shackle (1) is swung in the direction of the stationary shackle (1a) together with the medial axis (15), while FIG. 8 shows the trap almost in the trapping position, wherein the striking shackle (1) together with the medial axis (15) is moved even further in the direction of the stationary shackle (1a).

FIGS. 9 to 12 show essentially the same animal trap in a further embodiment. In this embodiment, the connecting web (15) is produced from a length of pipe, to which two plate hinges (4) have been welded, in which two iron rod shackles (1, 1a) produced are borne upon the offset pins (5, 5a) so as to be able to swing.

Both shackles (1, 1a) when in the trapping position form a pair of pincers inasmuch as, starting at their pins (5, 5a), they run parallel and are rectilinear throughout approximately half of their length, then are angled obtusely to the outside and finally at their ends turn toward each other at right angles. Thus, the shackles (1, 1a) while in the trapping position lie with their rectilinear longitudinal zones running parallel to each other while the angled end zones act in the manner of trapping pincers.

In this embodiment, screwed-shank springs serve as springs (3), with eyes (3a) and surround a plate hinge (4).

Because shackles (1, 1a) are obtusely angled (1b), an oblique forward area for the spring eye (3a) that virtually corresponds to the stopper (27) is created, which forces together the right-angular pincers of both shackles (1, 1a).

Both plate hinges (4) are fitted with security heels (28), upon which each spring (3) having an eye (3a) lies, whereby the springs are not permitted to twist and control the shackles (1, 1a) in an undesirable slanted position.

The release mechanism (17) in this animal trap embodiment has a lever (29) that lies underneath and is able to swing upon the medial axis (15), which lever (29) at its free end accepts on pin (31) a release hook (30) capable of swinging, and which reaches around the striking shackle (1) in the tensed position.

To release hook (30) is attached a release bar (32) that extends into the zone of the medial axis (15) for the purpose of receiving bait.

The animal trap is set under tension by placing it on the ground and swinging apart both shackles (1, 1a) against the force of the spring, whereby the screw-shank springs (3) can be tensed. Release hook (30) is then swung over the striking shackle (1) so as to lock the device in the tensed position, inasmuch as the medial axis (15) acts with a stop (33) upon lever (29), so that the lever (29) is prevented from swinging and the animal trap can be stabilized.

When the animal pulls on the bait, the release lever (32) is swung upwards, whereby the release hook (30) slews about its pin (31) to slide away from the striking shackle (1), so that both springs (3) are able to cause the shackles (1, 1a) to close, wherein the stationary shackle (1a) maintains practically the same position, and it is merely the striking shackle (1) that turns on its axis, whereby at the same time the trap swings about the medial axis, since the lever (29) does not leave the ground.

Both shanks of each spring (3) are held together in the tensed condition by means of a security part such as security hook (18) until the release hook (30) is positioned over the shackle (1), whereafter the security hook (28) loses its effect, the spring shanks by contrast being tensed to a somewhat greater degree and the security hook (18) releases one spring shank, thus permitting the trap with its shackles (1, 1a) to close unhindered.

Figure 14:
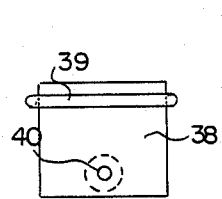
Figure 13:
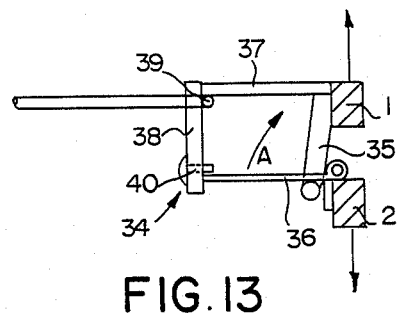
Figure 15:
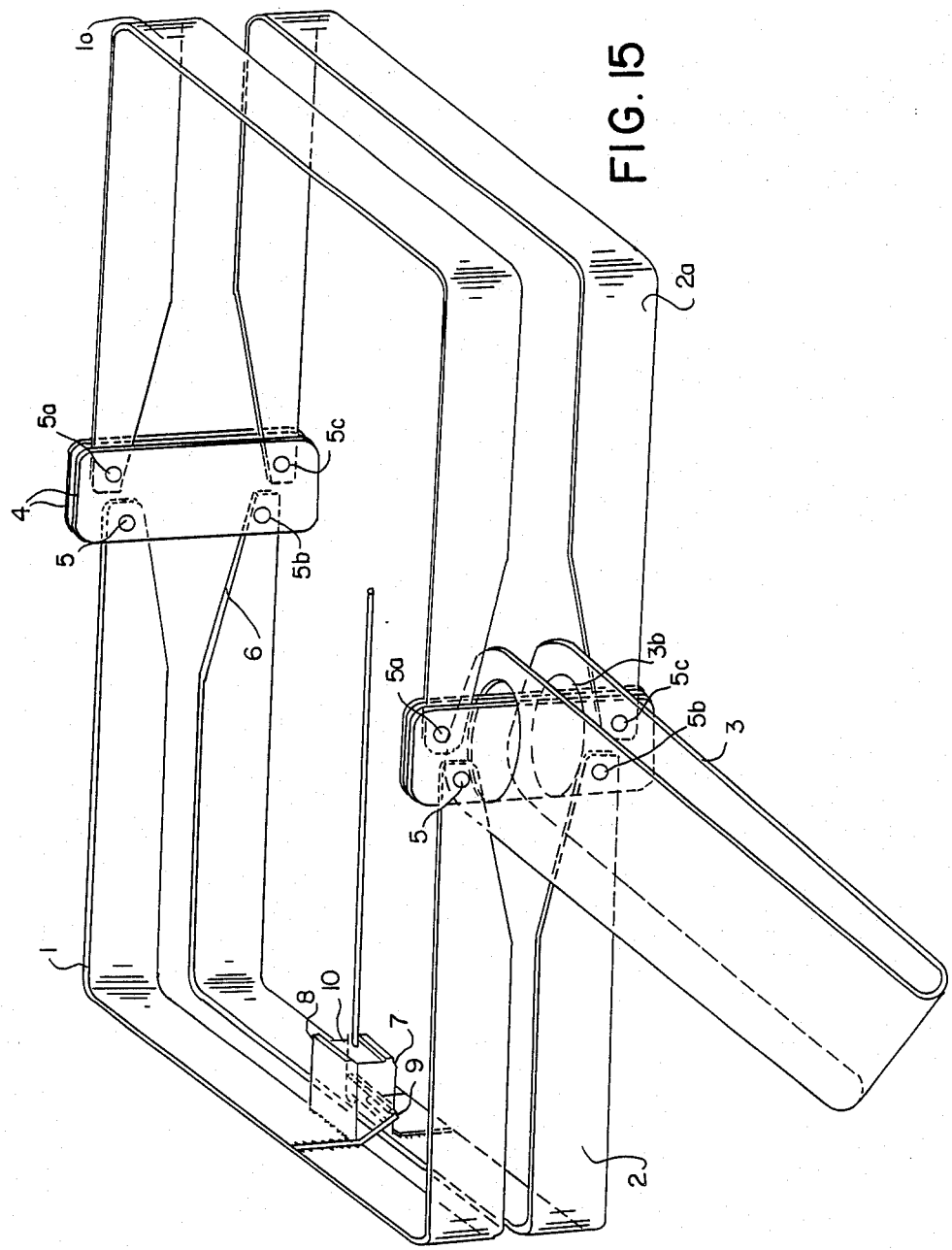
Figure 16:
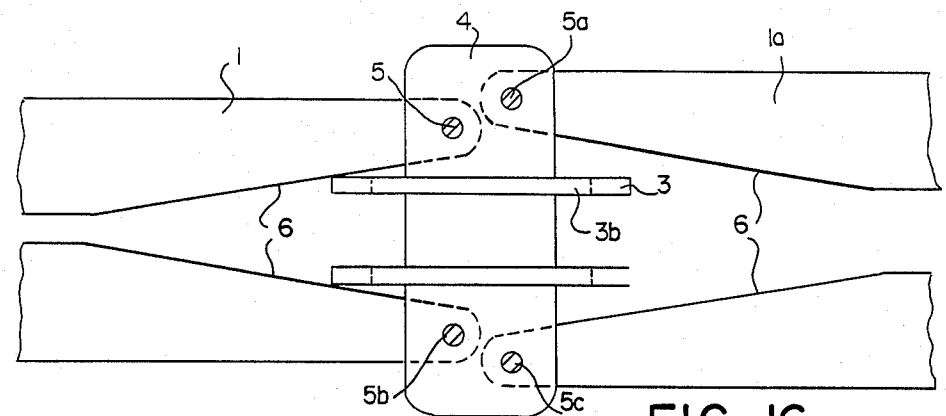
Figure 17:
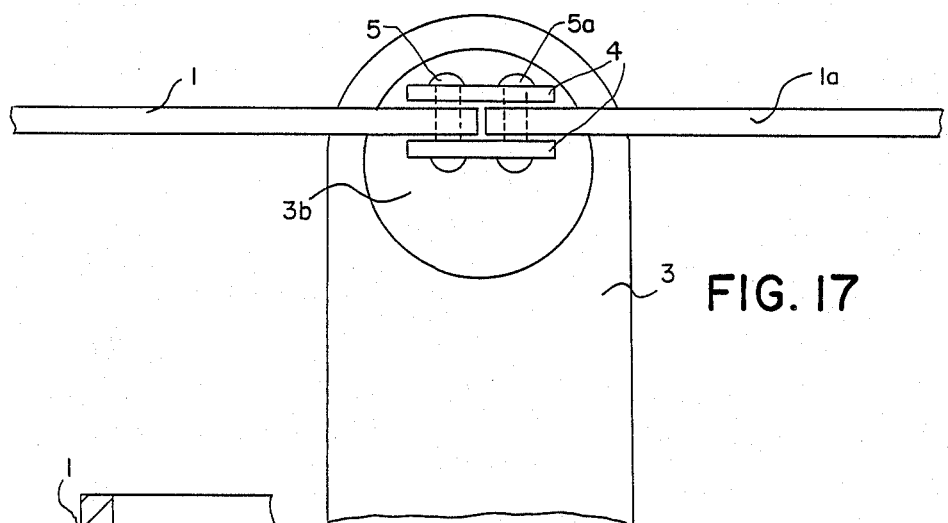
Figure 18:
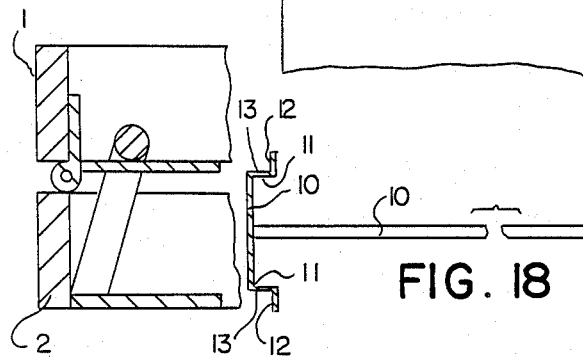
Figure 19:
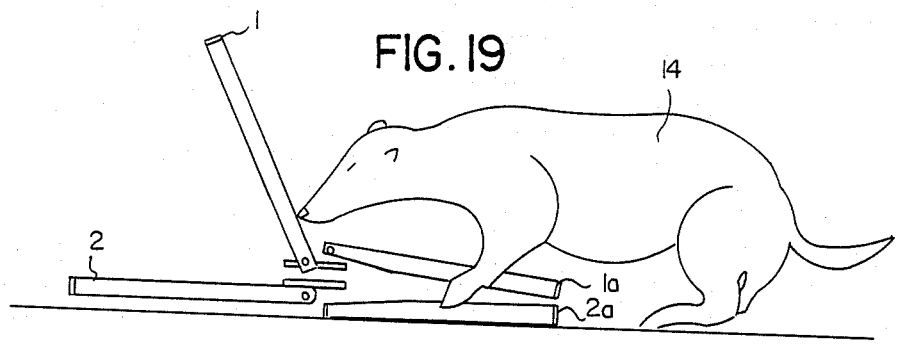
FIGS. 19 to 21 the shackles of the trap in three operating phases, whereby a badger (14) represents the trapped animal.
Figure 20:
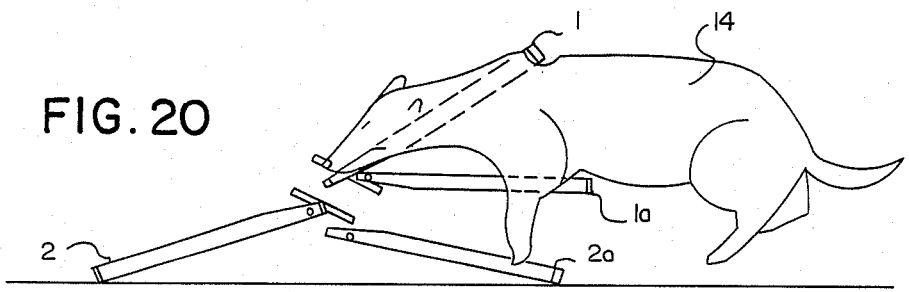
Figure 21:
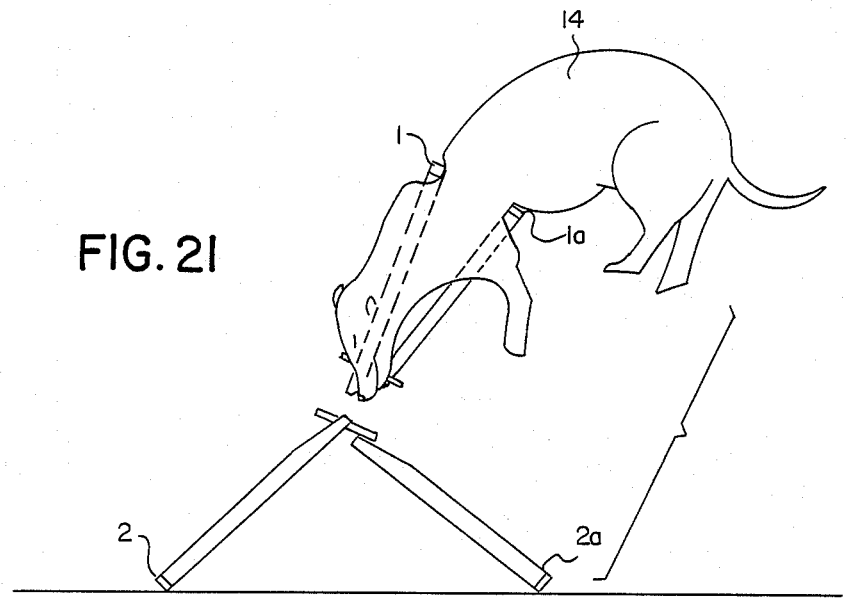

Shown in FIGS. 13 and 14 is a release mechanism (34) suitable for a four-shackle trap, which release mechanism is arranged between two shackles (1, 2) lying one above the other. In this embodiment, a security hook (35) is attached to one shackle (1) while on the other shackle (2) is arranged a hinge (36) which, when the trap is in the tensed condition, is seized by security hook (35), whereby the shackles (1, 2) that are being forced toward the outside (opposite direction) are held together.

Between a stop (37) attached to the shackle (1) and the hinge (36) is inserted a release part (38) having a guide ledge (39) and a guide pin (40), such that between stop (37) and hinge (36) a three-point guiding system is provided by release part (38) and that such a three-point guiding system (39, 40) secures the shackles (1, 2) in the tensed position.

Should the animal pull at the bait attached to the release part (38) such bait is pulled out of the stop (37) and hinge (36) and the shackles (1, 2) are permitted to close, whereby at the same time the security hook (35) causes hinge (36) to swing in direction A. Release part (38) permits a release of the animal trap during upward, downward and lateral movement, since this release part (38) with its three-point guide system (39, 40) is withdrawn from both parts (37, 36).

In FIG. 1, an additional security bolt (41) having a hook-shape is attached to release mechanism (16), which security bolt (41) is permitted to pivot upon its upright axis and with its hooked portion (41a) is able to reach over the release hook (25), so that additional security is provided against the untimely striking of the shackles (1, 1a) during trap assembly, since security bolt (41), when locked prevents the security frame (20) from springing free of release hook (25).

As shown in FIGS. 6 to 8, the release bar (23) is fitted with an adjustment screw (42) that in concert with the rectangular lever (20) permits the regulation of the release force and the overhang permitted between the hook (25) and the security frame (20) around which it hooks.

The animal trap in accordance with the further embobiment according to FIGS. 15 to 21 consists of two pairs of shackles (1, 1a; 2, 2a) that are borne in two plate hinge arrangements (4) having pins (5, 5a; 5b, 5c) so as to be permitted to swing, and tensed against each other in pairs by means of a spring (3) that surrounds one of the plate hinge arrangements, and locked in pairs by means of a release mechanism (7, 8, 9, 10, 10a, 11, 12, 13). Shackles (1, 1a; 2, 2a) are angled towards the pins (5) (Slope 6). The two shackle pairs (1, 1a; 2, 2a) are caused to snap together by means of a steel band spring (3) at whose ends are featured a centred bore (3b).

Pins (5, 5a; 5b, 5c) of the opposing shackles are offset in the vertical direction, which arrangement depends on the size of model employed.

The opposing shackles (1, 1a; 2, 2a) have differing lengths. The length of the shackles (1 ; 2) having the lower-lying pins (5; 5b) exceed that of the opposing shackles (1a; 2a) by an amount corresponding to the degree to which they are set off from each other. Thus, the shackles are permitted to close cleanly.

The shackles are held between two central parts (4) by means of bolts (5) that run through the holes in the plate hinge arrangements. Between shackles and central parts are situated washers.

A security element can consist of a frame of iron rod whose dimensions are such that in the tensed state it can be pulled with only a little pressure backwards over the curve to the end of the spring. So as to prevent the iron rod frame from separating entirely from the spring, a crossbrace can be welded in.

Release occurs by means of a separate, forked release rod (10a) that extends into the free space of the trap and is welded to an adjusting plate (30a) of the locking mechanism suitable for the release mechanism (7; 8; 9;) which adjusting plate is arranged between the shackles (1, 2) so that it can be released when the spring (3) is in the tightened condition.

The adjusting plate features at both ends a resting surface set at an angle of preferably 125 degrees onto which another vertical part (12), approx. 5 mm wide, is set on its edge.

To the upper shackle is welded a joint, the length of whose shank is the same as that of a piece of plate (8) belonging to the lower shackle, which joint is welded at an angle of 90 degree to the underside ( of the side that closes together ).

An angular element of iron rod (9) is welded to the lower shackle (2) beside the adjusting plate (8), and the dimensions of the angular element of iron rod (9) are such that it can lie above joint (7) of the upper shackle (1), in order that, in the tensed condition of the spring, a connection can be effected between shackle (1) and shackle (2).

The arrangement of the independent shackle (1; 1a; 2; 2a), causes the trap to become a fully new universal trap. Such a construction permits the four shackles (1; 1a; 2; 2a) to close at different intervals, whenever the trap is erected upon the ground to be employed as a trigger-or-footstep actuated mechanism. The upper shackle (1), (the striking shackle) which is connected to the release mechanism, closes over the animal to be trapped. At the same time, the lower shackle (2) presses forward, the result of which being that the upper shackle (1) slides farther over the trapped animal. At this point, the stationary shackle (1a) begins to close, trapping the animal, whereupon the latter is flung upwards by the lower stationary shackle (2a). Such a sequence of events is permitted to occur because pins (5; 5a, 5b; 5c) of the individual shackles (1; 1a; 2; 2a) have been assembled in an offset manner. For this reason, shackles (1; 1a, 2; 2a) have varying lengths, which permits a clean snapping action. The striking ability of the shackles (1a; 2a) is maintained even if spring (3) is positioned toward the inside.

It is evident that the trap can be positioned in such a way that the animal to be trapped may enter the trap either across the stationary shackle (1a; 2a) or across pins (5, 5a; 5b; 5c). Such a situation can be arranged if a barrier is erected in front of the striking shackles (1; 2).

I claim:

1. Animal trap having two shackles borne opposite each other in plate hinges, whereby the pair of shackles can be tensed by means of one or more tension springs and by means of a release mechanism can be maintained in a locked condition, whereby the pins (5, 5a) of each of the opposite shackles (1, 1a) are offset vertically in relation to each other, and that the amount by which both shackles (1, 1a) are either longer or shorter corresponds to the distance through which the pins (5, 5a) for both shackles are offset from each other.

2. Animal trap in accordance with claim 1, whereby both plate hinges (4) are kept at a distance from each other by means of a connecting web (15) that forms a medial axis of the animal trap.

3. Animal trap in accordance with claims 1 or 2, whereby arranged about each plate hinge (4) is a spring (3) embodied as a flat shank spring, the said spring (3) with bores (3b) situated in the longitudinal extremity zones of the shanks surrounding the plate hinge (4) and lying underneath shackle (1, 1a).

4. Animal trap in accordance with claims 1 or 2, whereby both shackles (1, 1a) are formed from flat iron into a U-shape and run parallel to each other when the trap is in the tensed position.

5. Animal trap in accordance with claims 2, whereby the release mechanism (16) is fashioned from an angular lever (20) borne on the connecting web (15) by means of a hinge (19) in such a way that it is permitted to slew, the said angular lever (20) featuring at the free end of its angled shank (20a) a bearing sleeve (21), in which a security frame (22) formed from a frame of iron rod is borne so as to be able to slew upwards and upon angular lever (20) a release bar (23) capable of slewing about a horizontal pin (24), the said release bar having at one end a bait receiving part (26) and at the other end a release hook (25) that hooks around security frame (22).

6. Animal trap in accordance with claims 5, whereby in the release bar (23) is arranged an adjustment screw (42) that acts together with the angular lever (20) and adjusts the distance at which the said angular lever (20) hooks around the security frame (22).

7. Animal trap in accordance with claim 1, whereby both plate hinges (4) are maintained at a distance from each other by means of a connecting pipe (15) that forms the medial longitudinal axis of the animal trap and both shackles (1, 1a) are formed from iron rod shackles and arranged about each plate hinge (4) is a screw-shank spring (3) with a spring eye (3a).

8. Animal trap in accordance with claim 7, whereby each plate hinge (4) is fitted with a security plate (28) that serves as a support for the spring eye (3a).

9. Animal trap in accordance with claims 7 or 8, whereby both shackles (1, 1a) run through a partial zone of their length in a straight line to form parallel guide shanks, following the rectilinear zone have an outwardly oriented, obtuse angulation (1b) and following the said angulation have as grasping pincers angled, preferably right-angled angulations (1c) that are directed toward each other.

10. Animal trap in accordance with claims 7 or 8, whereby the release mechanism (17) features a lever (29) borne so as to be able to swing about connecting pipe (15) and rest against a support (33) facing the said connecting pipe, and a release hook (30) that is permitted to swing about a pin (31) and hook around the U-web of a shackle (1), to the said release hook (31) is connected a release lever (32) that extends into the zone of the connecting pipe (15) in order to receive bait.

11. Animal trap in accordance with claim 1, whereby a release mechanism (34) suitable for a four-shackle trap features a release part (38) that can be inserted between a hinge (36) of one shackle (2) and a stop of a second shackle (1) within a three-point guide system (39, 41), the said release part working together with a security hook (35) that is attached to the shackle (1) and hooks over the hinge (36).

12. Animal trap, in particular in accordance with claim 1, having four shackles, of which two are borne facing each other in a plate hinge, whereby the pair of shackles can be set to oppose each other under tension by means of a tension spring and can be maintained in a locked condition by means of a release mechanism, whereby the pins (5, 5a, 5b, 5c) of the opposing shackles (1, 1a; 2, 2a) are set off vertically from each other and the opposing shackles (1, 1a, 2, 2a) are either longer or shorter by an amount corresponding to the distance by which the pins (5, 5a, 5b, 5c) for the opposing shackles are set off from each other.

13. Animal trap in accordance with claim 12, whereby a separate release rod (10a), which extends into the free space of the trap and is forked, is welded to an adjustment plate (10) conceived for the purpose locking the release mechanism (7, 8, 9), the said adjustment plate being arranged between two shackles so as to be releasable in the tensed condition of the spring (3).

14. Animal trap in accordance with claim 13, whereby the adjustment plate (10) features at both ends a support (13) set at an angle of 125 degrees, on which, 5 mm wide, another vertical part (12) is set on its edge.

15. Animal trap in accordance with claim 12, whereby to the upper shackle (1) is welded a joint (7), the length of whose shank features the same dimensions as those of a plate (8) of the lower shackle (2) welded at an angle of 90 degrees to the under edge (of the striking side).

16. Animal trap in accordance with claims 13 or 14, whereby the dimensions of an angular section of iron rod (9) welded beside plate (8) to the lower shackle (2) are such that the said angular section of iron rod is permitted to lie above joint (7) of the upper shackle (1) and in the tensed condition of the spring (3) effects a connection between shackle (1) and shackle (2).

* * * * *